June 3, 1947.  P. WILLIAMS  2,421,731
MACHINE FOR CUTTING SHOE SOLE TAPS
Original Filed Jan. 21, 1944  4 Sheets-Sheet 1

June 3, 1947.　　　　P. WILLIAMS　　　　2,421,731
MACHINE FOR CUTTING SHOE SOLE TAPS
Original Filed Jan. 21, 1944　　4 Sheets-Sheet 4

Inventor:
Parker Williams,
by J. H. McCready,
his Attorney.

Patented June 3, 1947

2,421,731

UNITED STATES PATENT OFFICE 2,421,731

MACHINE FOR CUTTING SHOE SOLE TAPS

Parker Williams, Weston, Mass., assignor to Williams Cut Sole Co., Boston, Mass., a corporation of Massachusetts Original application January 21, 1944, Serial No. 519,110. Divided and this application December 8, 1944, Serial No. 567,204

6 Claims. (Cl. 164—19)

1

This invention relates to the manufacture of shoe sole taps of the so-called "angle" type. This type of tap has front and rear straight edges approximately parallel to each other, and side edges which are inclined at different angles to said front and rear edges so as to approximate the inclination of the inner and outer edges of the forepart of a shoe sole. Naturally these angles in a left tap are inclined oppositely to those for a right tap.

The customary method of cutting such taps is to strip sole leather into suitable widths for the particular size of tap to be made, the width of the strip being equal to the length of the tap, and then to cut across this strip at suitable angles to produce either right or left taps, depending upon the angle at which the knives are set.

Competition in this line is so keen that a saving of even, say, one-tenth of a cent per pair of taps, is a very important matter to the manufacturer of these goods. The present invention aims to improve the machines for cutting angle taps with the object of reducing the time and labor involved in this operation.

The nature of the invention will be readily understood from the following description when read in connection with the accompanying drawings, and the novel features will be particularly pointed out in the appended claims.

Figure 11:
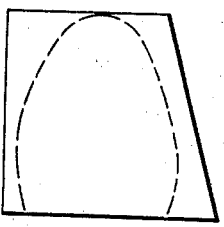
Fig. 11 is a plan view of a typical angle tap.

Referring first to Fig. 11, the tap there shown is like the common commercial article which has long been on the market. This is a right tap and the final product made from it has a shape like the forepart of a right shoe sole, substantially as indicated in dotted lines in said figure.

Figure 6:
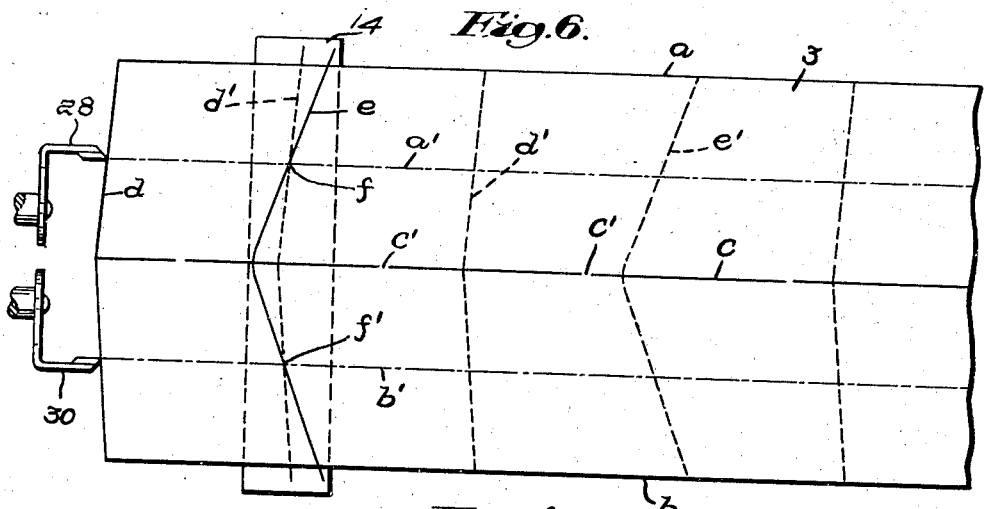
Fig. 6 is a plan view illustrating a step in the novel method of this invention.
Figure 7:
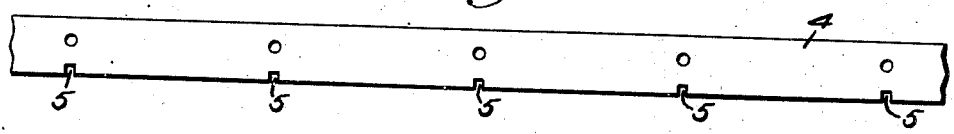
Fig. 7 is a side view of a knife used in performing one of the operations of this method.

According to the method of this invention sole leather is cut into strips 3, like that shown in Fig. 6, having opposite parallel edges $a$ and $b$, each strip being of a width equal to the combined length of a right and left tap positioned end to end. This strip next is cut along an intermediate line C, parallel to and equally spaced from the outer edges $a$ and $b$, to substantially divide the strip into two equal sections, while still leaving these sections connected together sufficiently to enable the entire strip to be handled efficiently. Preferably this cutting operation is performed in a stripper with a knife like that shown at 4 in Fig. 7, the cutting edge of the knife being notched at intervals, as indicated at 5, so that when it cuts through the strip 3 it will leave uncut portions or ligaments $c'$ serving to connect and hold the two sections together.

Next, transverse V-shaped cuts are made entirely across the strip 3, the first cut being made at $d$, Fig. 6, to produce an end of suitable shape on the strip and the next cut being made at $e$, the latter cut being at a sharper angle than the first cut. And these operations are repeated, as shown at $d'$ and $e'$, and so on, one cut alternating with another to the end of the entire strip.

Figures 8, 9:
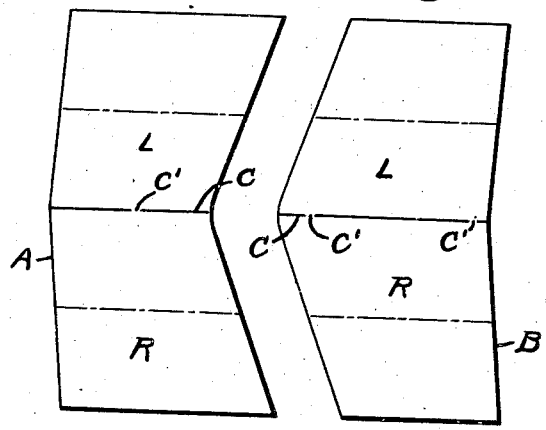
Figs. 8 and 9 are plan views of the articles cut from the sole leather strip shown in Fig. 6.

Sole leather sections so produced are shown at A and B in Figs. 8 and 9. It will be observed that the section A contains two angle taps. If we assume that the grain side of the leather is down, then the lower one will be a right and the other a left. In section A the two taps are positioned toe to toe, while in the other section they are located heel to heel.

Thus, by this method, a pair of right and left taps are produced at each cut following the first one. The two taps in each section may or may not be connected together by the uncut portions $c'$, depending on the spacing of these connecting points. If they are so connected then they may be easily separated simply by bending the two sections along the middle line of cut C.

The present invention provides a novel machine for producing taps in accordance with the method above described. Fundamentally this machine is like that known commercially as the Knox Sole Cutter shown in Patent No. 1,191,344, but it includes modifications embodying features of this invention which are essential to production of the desired results. The Knox machine is well known in the cut sole trade and requires no description except to point out that it comprises two cutter heads or beams 6 and 7, respectively, Figs. 1 and 2, pivoted on the machine frame at 8 and 9 and carrying two knives 10 and 11, respectively. The beams are operated by connecting rods 12 and 13 running to eccentrics on a shaft located in the base of the machine frame, so that the beams are swung about their respective pivots 8 and 9 to bring the cutting edges of their respective knives 10 and 11 alternately down into contact with the upper surface of the cutting block 14.

The strip of sole leather to be cut is fed to the cutting block across the upper surface of a flat table 19 and is guided by one edge running in contact with a guide plate 15. The latter is adjustable transversely in a direction parallel with the beams and is clamped in its adjusted position by the bolt 16 provided with a handle 17.

In using the machine in the customary manner the strip of sole leather is fed by hand across the table 14 and the cutting block until its forward edge strikes a stop. Assuming that the machine is running, a pair of ejecting arms 18 strike the end that has been severed by the first cut and knock it down, the operator continuing to feed the stock forward as rapidly as he is allowed to by the action of the knives. The feed, of course, takes place only between cuts, and these operations are continued until the entire strip has been worked up. At all times the edge of the strip is guided against the side gauge 15.

So far as the construction and operations above described are concerned, they are like those of the regular commercial machine.

For the purposes of this invention, however, the customary knives are replaced with special angular knives adapted to make the cuts $d$ and $e$, Fig. 6. One of these knives is shown at 11 in Figs. 3, 4 and 5. It has a sturdy frame or body 11a and a cutting knife or blade 11 secured to it. This particular knife is intended to make the cut $e$, Fig. 6, but the other knife is like it except that it has a flatter angle adapted to make the cut $d$.

Figure 1:
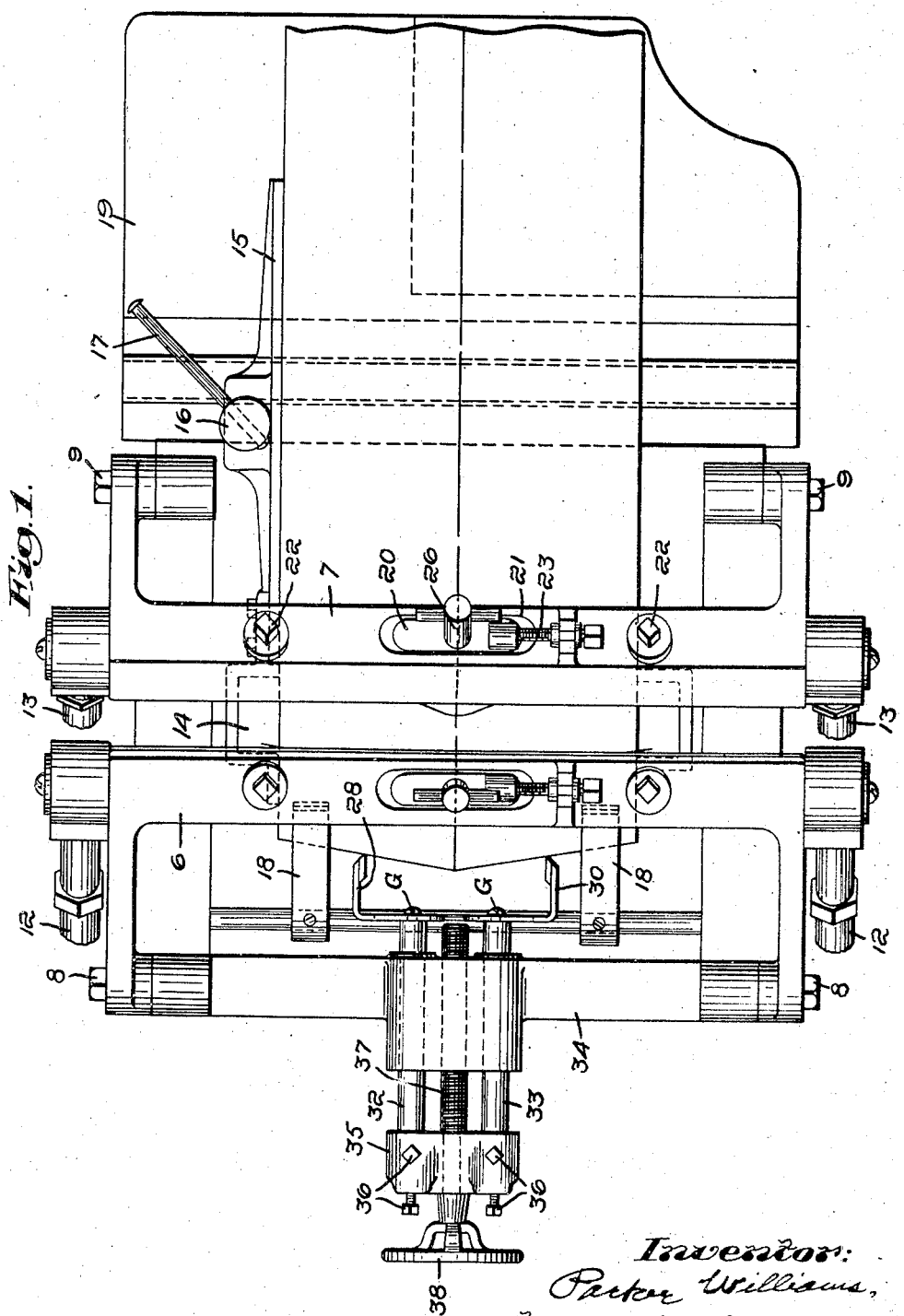
Fig. 1 is a plan view of a sole cutting machine of a common form but modified in accordance with this invention.
Figure 2:
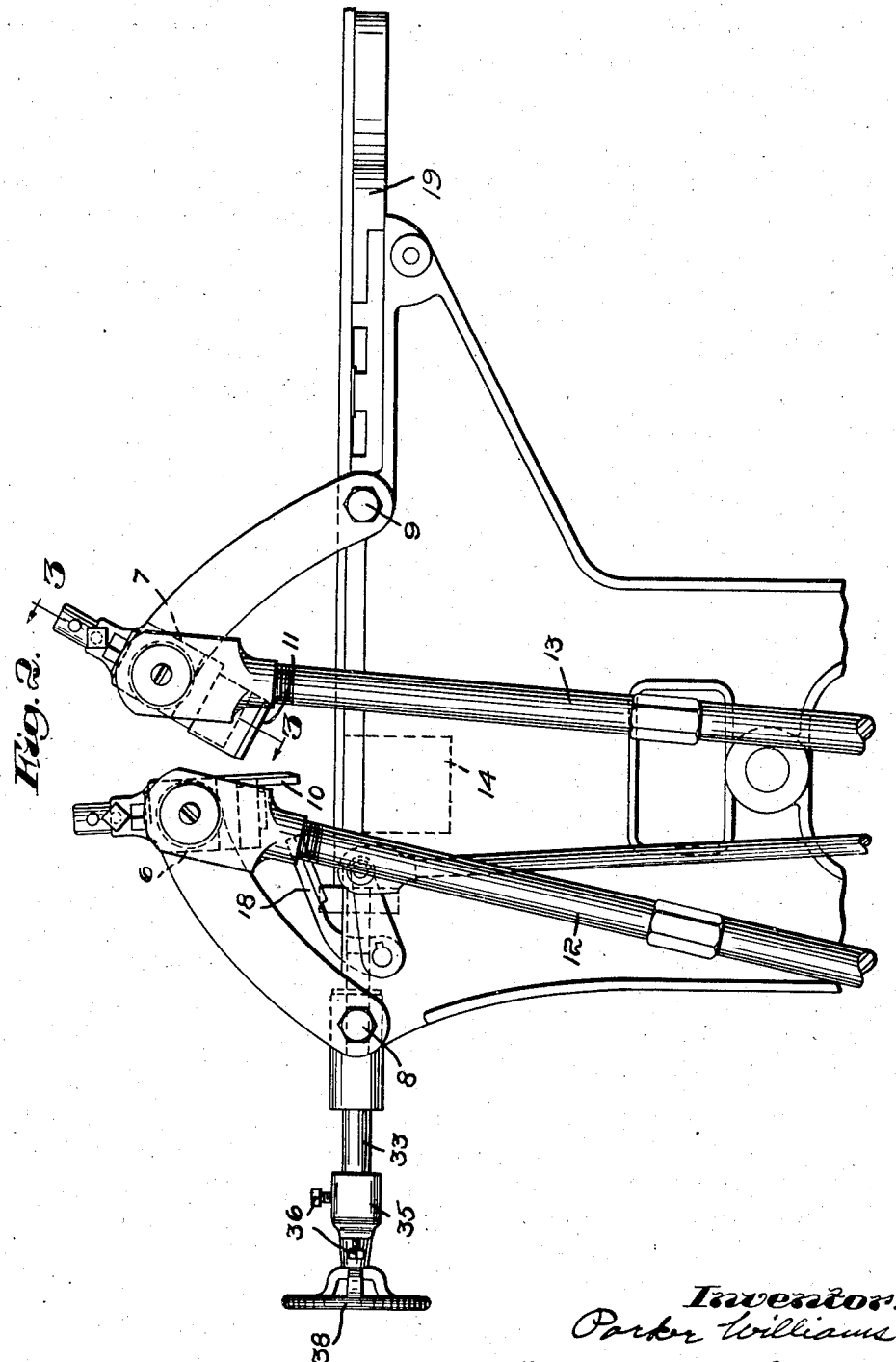
Fig. 2 is a side elevation of the upper part of the machine shown in Fig. 1.
Figure 3:
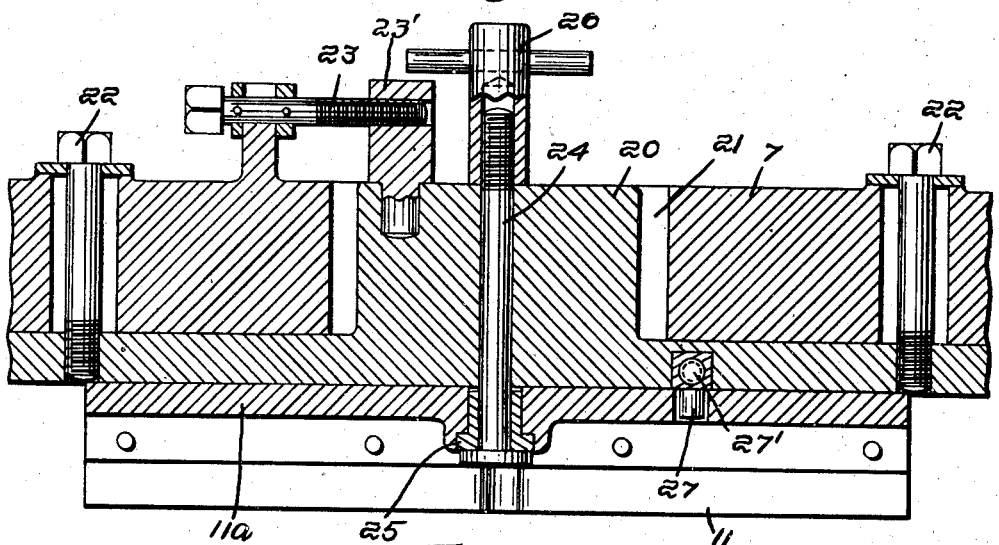
Fig. 3 is a sectional view through the knife holder, this section being taken on the line 3—3, Fig. 2.

In order to mount the knife on the beam 7 a holder 20 or "internal beam," so called, Figs. 1 and 3, is provided, this holder being of an inverted T-shape with the stem or shank of the T located in a slot 21 formed in the beam 7, and the bar of the T being pulled up snugly against the bottom of the beam by bolts 22—22, Figs. 1 and 3. These bolts project through slots in the beam, as clearly shown in Fig. 3, and the entire holder may be adjusted lengthwise of the beam by the adjusting bolt 23 which has a rotative relation only to the beam but is screw-threaded into a block 23' set into the holder 20.

The knife is clamped to the bottom of the holder by a bolt 24, Fig. 3, which passes freely through the holder 20, while the bolt head on its lower end bears against the lower end of a bushing 25 set into the frame 11a of the knife assembly or cutter unit. The stem of the bolt passes through this bushing and a T-shaped nut 26 is threaded on the upper end of the bolt and bears against the upper surface of the part 20 so that by turning up this nut the knife frame is pulled up securely against the bottom of the holder 20.

Figure 4:
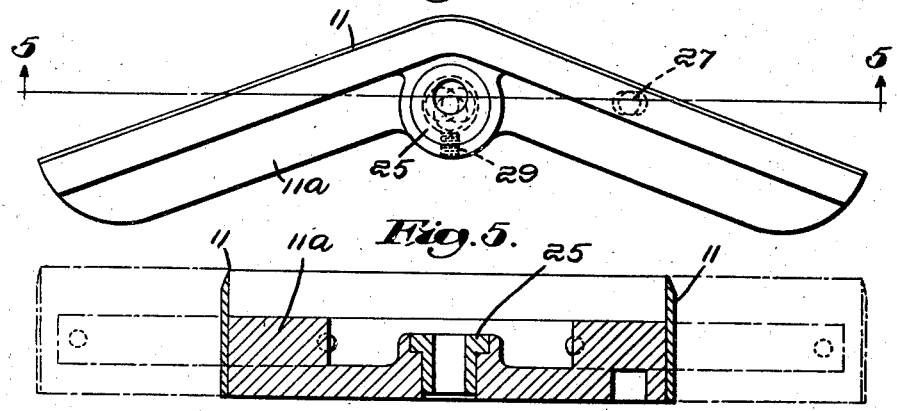
Fig. 4 is a plan view of a cutting knife provided by this invention.
Figure 5:
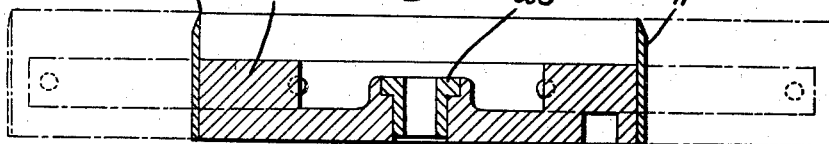
Fig. 5 is a vertical, sectional view on the line 5—5, Fig. 4.

It is important to have the two knives, that make the cuts $d'$ and $e$, set so that in making these cuts $d'$ and $e$ the cutters impinge upon the cutting block 14 in lines that intersect each other exactly in median lines $a'$ and $b'$ as shown in Fig. 6 directly above the block 14 which is shown diagrammatically in said figure. For this reason means is provided for adjusting the relative distance between the knives so that, no matter what size tap is cut, the intersections of said lines of impingement of the two knives on the block will always come in the two median lines just referred to. As shown in Figs. 3 and 4, the bushing 25 has an eccentric hole for the passage of the bolt 24 so that by turning this bushing the knife frame is moved forward or backward. A pin 27, Figs. 3 and 4, which projects downwardly from the internal beam 20 can also be adjusted by means of a screw 27', with which the Knox machine customarily is equipped, so that the net result of the two adjustments is to move the knife backward or forward by the necessary amount to make the two knives cut on the same center line, as indicated in Fig. 6 at $d'$ and $e$. By the "center line" is meant a straight line through the intersecting points $f$ and $f'$, Fig. 6, and at right angles to the side edges $a$ and $b$. The bushing is locked in its adjusted position by a set screw 29.

Thus, with this arrangement, the center line of one of the knives can be adjusted so that it will coincide with that of the other. This is important in setting the machine to cut taps of different sizes, as any change in the length of the tap causes a consequent change in the center line of that tap, as indicated at $a'$ or $b'$ in Fig. 6.

Figure 10:
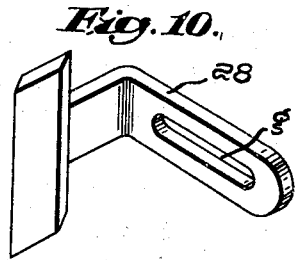
Fig. 10 is a perspective view of one of the gauges shown in Figs. 1 and 6.

The extent of the feeding movement of the leather strip 3 between successive cuts must be equal to the average width of the taps. This width is measured along the median lines $a'$ and $b'$, Fig. 6, which, of course, is spaced from the outer guiding edges $a$ and $b$ by a distance equal to one-quarter of the over-all width of the strip 3. For this purpose gauging devices or stops 28 and 30, Figs. 1 and 6, are provided to engage the forward end of the strip 3 exactly at the ends of the lines $a'$ and $b'$ and they are so adjusted that the distance which the strip is fed between successive cuts will always be exactly the desired value. These stop devices 28 and 30 are like that shown in Fig. 10, and they are secured to the forward ends of guide rods 32 and 33, respectively, Fig. 1, both slidable through the central portion of a bar 34 which forms part of the machine frame. A yoke 35 connects these rods and permits one to be adjusted relatively to the other by means of set screws 36. This yoke carries an adjusting screw 37, provided with a hand wheel 38, which rotates freely in the yoke but is threaded into the bar 34. The stops 28 and 30 are slotted, as indicated at $g$ in Fig. 10, to receive fastening screws or bolts G, Fig. 1, by means of which they are secured to the rods 32 and 33. Thus the stops 28 and 30 can readily be adjusted toward and from each other and also toward and from the path of travel of the material to be cut.

It will be seen from the foregoing that this invention effects an important economy in the manufacture of angle taps. As compared with the old machine it substantially doubles the rate of production with only a very trifling, if any, increase in the expense of preparation of the sole leather for the cutting step. In this connection it may be pointed out that while the stock from which the taps are cut has been referred to as "sole leather," since this is the material more commonly used for this purpose, the invention is equally useful in making taps of this kind from other types of shoe sole material. Consequently, the term "sole leather" or "leather," as herein used in the specification and claims is intended to include other forms of outsole stock. Also, by the term "a pair of right and left taps" I mean a right and a left tap as shown, for example, in Fig. 8 or in Fig. 9.

While the preferred embodiment of this invention is illustrated in the drawings, it will be evident that the invention is not limited to embodiment in the particular form shown.

This application is a division of my pending application Ser. No. 519,110, filed January 21, 1944, the claims in this application being limited to the machine structure, while the claims in the parent application define applicant's method and a novel product produced by that method.

Having thus described my invention, what I desire to claim as new is:

1. In a shoe tap cutting machine, the combination of a cutting block, means for guiding into cutting position across said block a strip of sole leather having a width equal to twice the over-all width of a pair of right and left taps positioned end to end, supports for two cutting knives, mechanism for moving said knives alternately to cut through said strip and against said block, and two knives mounted in said respective supports, one shaped to cut the forward edge of a sole leather section containing a right and a left tap disposed end to end and the other knife being shaped to cut the rear edge of said section, whereby a pair of said right and left taps will be severed from the strip at each cut after the first one.

2. A shoe tap cutting machine according to preceding claim 1, in combination with two stops positioned to engage the forward end of said strip at points spaced from the opposite edges of the strip by a distance equal to one-quarter of the entire width of the strip.

3. In a shoe tap cutting machine according to preceding claim 1, a construction in which said knives both have V-shaped cutting edges and the angle of one is substantially more obtuse than that of the other.

4. In a shoe tap cutting machine, the combination of a cutting block, means for guiding a strip of sole leather into cutting position across said block, said strip having a width equal to twice the over-all width of a pair of right and left taps positioned end to end, two beams, two V-shaped knives mounted in said respective beams, mechanism for operating said beams to cause said knives to cut alternately through said strip and against said block, one of said knives having a cutting edge of such angularity as to cut the forward edge of a sole leather section containing a right and a left tap disposed end to end, the other knife having an edge of different angularity shaped to cut the rear edge of said section, whereby a pair of right and left taps will be severed from said strip at each cut after the first one, and means for supporting one of said knives in its respective beam comprising an internal beam mounted for slidable adjustment in the main beam on which it is supported, means for locking said internal beam in its adjusted position in the main beam, and means for clamping a knife to said internal beam.

5. A shoe tap cutting machine according to preceding claim 4, in combination with additional parts cooperating with the means for securing said knife to said internal beam operable to adjust the knife at right angles to the direction of said sliding adjustment of said internal beam.

6. In a shoe tap cutting machine according to preceding claim 1, a construction in which said knives both have V-shaped cutting edges, the angle of one being substantially more obtuse than that of the other, in combination with means cooperating with said supports for the two cutting knives to support them for independent adjusting movements both toward and from each other and also in parallel directions at right angles to said adjusting movements toward and from each other, whereby the cutting edges of said knives may be made to impinge upon said cutting block in lines that intersect each other exactly in the two median lines on said strip which are spaced from the outer edges of said strip by a distance equal to one-quarter of the over-all width of the strip, and two stops positioned to engage the forward ends of said strip at points in line with said respective median lines.

PARKER WILLIAMS.

REFERENCES CITED

The following references are of record in the file of this patent:

UNITED STATES PATENTS

| Number | Name | Date |
| --- | --- | --- |
| 803,710 | Quarmby | Nov. 7, 1905 |
| 846,153 | Souther | Mar. 5, 1907 |
| 1,936,088 | How | Nov. 21, 1933 |
| 1,002,296 | McPike et al. | Sept. 5, 1911 |